United States Patent
Grabb et al.

(10) Patent No.: US 6,538,704 B1
(45) Date of Patent: Mar. 25, 2003

(54) NTSC TUNER TO IMPROVE ATSC CHANNEL ACQUISITION AND RECEPTION

(75) Inventors: Mark Lewis Grabb, Burnt Hills, NY (US); Kenneth Brakeley Welles, II, Scotia, NY (US); John Erik Hershey, Ballston Lake, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/422,444

(22) Filed: Oct. 21, 1999

(51) Int. Cl.[7] .......................... H04N 5/44; H04N 5/455; H04N 5/50; H03K 5/159; H04B 1/18
(52) U.S. Cl. ...................... 348/731; 348/725; 348/726; 348/732; 375/229; 375/232; 455/179.1; 455/180.1; 455/182.3; 455/185.1; 455/186.1
(58) Field of Search ................................ 348/725, 731, 348/726, 727, 732, 553–555, 180, 189; 375/229, 232, 350; 455/182.3, 179.1, 185.1, 186.1, 180.1

(56) References Cited

U.S. PATENT DOCUMENTS

| | | | | |
|---|---|---|---|---|
| 5,461,427 A | * | 10/1995 | Duffield et al. | 348/555 |
| 5,502,506 A | * | 3/1996 | Choi | 348/607 |
| 5,502,507 A | * | 3/1996 | Kim | 348/607 |
| 5,648,987 A | * | 7/1997 | Yang et al. | 375/232 |
| 5,654,765 A | * | 8/1997 | Kim | 348/614 |
| 5,675,394 A | * | 10/1997 | Choi | 348/614 |
| 5,734,444 A | * | 3/1998 | Yoshinobu | 348/731 |
| 5,757,441 A | * | 5/1998 | Lee et al. | 348/731 |
| 6,115,080 A | * | 9/2000 | Reitmeier | 348/731 |
| 6,118,498 A | * | 9/2000 | Reitmeier | 348/725 |
| 6,137,546 A | * | 10/2000 | Shintani et al. | 348/731 |
| 6,222,592 B1 | * | 4/2001 | Patel | 348/614 |

* cited by examiner

Primary Examiner—John Miller
Assistant Examiner—Paulos M. Natnael
(74) Attorney, Agent, or Firm—John F. Thompson; Patrick K. Patnode

(57) ABSTRACT

Reduction in the time required for an Advanced Television Standards Committee (ATSC) digital television tuner to equalize, converge, and acquire a digital television signal suitable for viewing, wherein early model ATSC tuners also include a National Television Standards Committee (NTSC) analog tuner, is achieved by using a microprocessor to control use of the NTSC tuner to scan television channels. A channel measurement module converts the scanned analog signal to a digital signal, and the equalization coefficients for the resultant digital signal are stored in memory. The equalization coefficients stored in memory are then accessed and utilized to tune in new channels on the ATSC tuner. The amount of time necessary for the ATSC tuner to tune in a new channel is thus reduced. When the ATSC tuner is in use, the equalization coefficient data stored in memory are periodically updated.

9 Claims, 2 Drawing Sheets

NTSC TUNER TO IMPROVE ATSC CHANNEL ACQUISITION AND RECEPTION

CROSS REFERENCE TO RELATED APPLICATION

The subject matter of this application is related to that of copending patent application U.S. patent application Ser. No. 09/422,445 filed Oct. 21, 1999 entitled "Optimization of Television Reception by Selecting Among or Combining Multiple Antenna Inputs". The disclosure of U.S. patent application Ser. No. 09/422,445 is incorporated herein by reference.

STATEMENT REGARDING FEDERALLY SPONSORED RESEARCH & DEVELOPMENT

The U.S. Government may have certain rights in this invention pursuant to the NIST Contract Number 70NANB8H4078, awarded by the National Institute of Standards and Technology.

BACKGROUND OF THE INVENTION

1. Technical Field

This invention relates to digital television (DTV) receivers and, more particularly, to the use of the NTSC tuner in production DTV receivers to improve channel acquisition and reception of the ATSC tuner.

2. Background Art

Digital television (DTV) receivers in the USA use NTSC (National Television Standards Committee) encoding of the old analog channels, and ATSC (Advanced Television Standards Committee) encoding of the new digital channels. In production, most digital television receivers will have one NTSC tuner and one ATSC tuner. During reception, only one tuner is in use decoding the program; whether that tuner is the NTSC tuner or the ATSC tuner depends on whether the channel being viewed is analog or digital.

When the ATSC tuner is set to a new channel, there is a significant time delay while the ATSC tuner acquires the new channel. This is due to many reasons, one of which is that the ATSC tuner must perform channel equalization in order to receive the digital data.

SUMMARY OF THE INVENTION

When changing channels from one ATSC channel to another ATSC channel, the present invention provides a way to use the signals from the NTSC tuner to speed the acquisition and lock on to the succeeding ATSC channel. The DTV receiver contains a microprocessor which controls many aspects of the receiver operation. This microprocessor constructs and maintains a database which contains information on each television channel.

When the television receiver is not being viewed (e.g., when the viewer turns off the display), the NTSC and ATSC tuners scan various channels and update this database. Each entry in the database corresponds to a channel. These channels may be terrestrial broadcast, satellite or cable channels. The data entered in the database for each channel include such information as whether a transmitter is detected, whether it is ATSC or NTSC, what hours of the day it operates, and how strong the signal is. If the channel is an ATSC channel, then the data will also include information about best estimate of the equalization coefficients needed to optimize reception. This database may be further enhanced by a time of day and day of the week index. For example, there may be significant multipath situations which are time sensitive; e.g., a metal door being in an open position for a fixed duration of time each day, etc. Thus, a specific channel might have multiple "best equalizer coefficient sets" during the day, depending on specific conditions.

When the television receiver is turned on and displaying a digital television signal, the ATSC tuner is dedicated to this selected channel. At this time, the microprocessor continuously cycles through all of the entries in the channel occupancy database. At each entry that is an ATSC channel, but not the channel currently being displayed, the microprocessor stops and tunes the NTSC tuner to this channel. When the NTSC tuner has stabilized on this channel, the microprocessor records the signal strength of the channel. This information comes from digitizing the NTSC tuner automatic gain control (AGC) voltage. The microprocessor then causes an analog-to-digital (A/D) converter to perform a large number of high speed A/D conversions on the NTSC signal. These conversions are stored in memory. After these conversions have been performed and recorded in memory, the microprocessor uses algorithms for preliminary equalizer coefficient calculations and calculates preliminary coefficients which the ATSC tuner equalizer section would use to tune in the ATSC signal. The microprocessor then makes an evaluation of whether these preliminary coefficients are likely to be better than the coefficients stored in the channel occupancy database entry for this channel. If the new coefficients are likely to cause the ATSC tuner to acquire this channel faster, then the new coefficients replace the old coefficients. If the new coefficients are not likely to speed the channel acquisition process, they are discarded. At this time, the microprocessor proceeds to the next ATSC channel entry in the database and repeats these operations. When the end of the database is reached, the microprocessor starts over at the beginning and continues cycling until the selected channel is changed by the viewer.

If the viewer changes channels to another ATSC channel, the microprocessor immediately goes to the channel occupancy database entry for the new channel. The microprocessor loads the preliminary coefficients into the ATSC equalizer section as the new frequencies are being loaded into the front end frequency synthesizers in the ATSC tuner. This procedure allows the first attempt at channel equalization to be much closer to the final value, speeding the convergence and reducing the time needed to acquire the new channel.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF THE INVENTION

Figure 1:
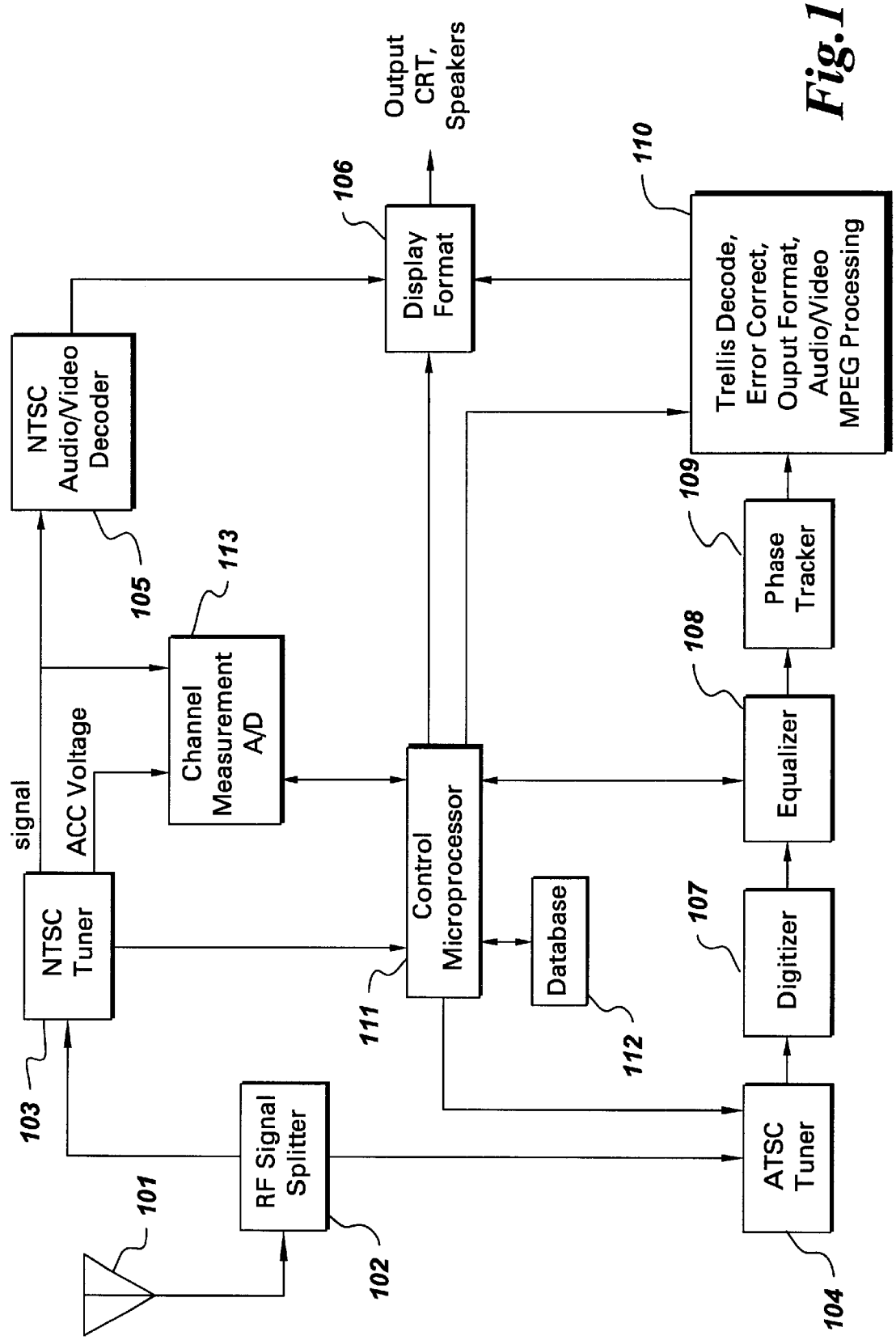
FIG. 1 is a block diagram of the front end of a DTV receiver which implements the present invention.

FIG. 1 shows some of the major components of the digital television (DTV) receiver front end. An antenna 101 is coupled to an RF (radio frequency) signal splitter 102 which feeds an NTSC tuner 103 and an ATSC tuner 104. The output of the NTSC tuner 103 is coupled to a conventional NTSC audio/video decoder 105 which provides a decoded output signal to display circuitry 106, the output of which is coupled to loudspeakers and a display such as a cathode ray tube (CRT) display (not shown). The output of ATSC tuner 104, on the other hand, is coupled to a digitizer 107, and the digitized signal is supplied to an equalizer 108. The equalized and digitized signal from equalizer 108 goes to a phase tracker 109. The output of phase tracker 109 is coupled to a trellis decoder, error correcting and MPEG (Motion Picture Experts Group) processor 110, the output of which is coupled to display circuitry 106.

The DTV receiver contains a microprocessor 111 which controls ATSC tuner 104, equalizer 108 and trellis decoder, error correcting and MPEG processor 110. Microprocessor 111 also constructs and maintains a database 112 which contains information on each television channel. The microprocessor does this through a channel measurement module 113 which receives the output signal from NTSC tuner 103 and an automatic gain control (AGC) signal from tuner 103.

Figure 2:
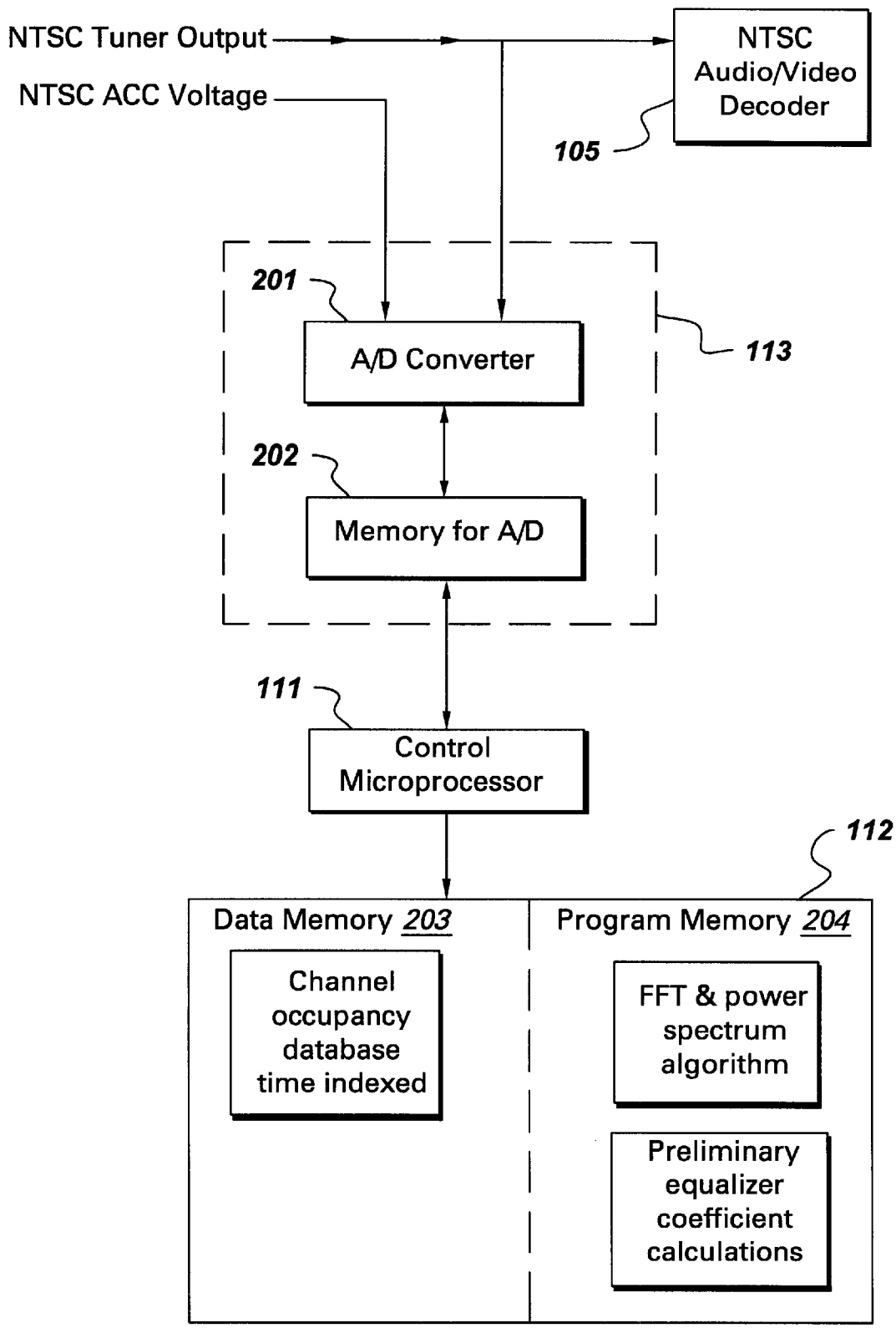
FIG. 2 is a block diagram showing in more detail the control microprocessor and an associated channel database in the circuitry of FIG. 1.

FIG. 2 shows microprocessor 111 with its related circuitry shown in more detail. The NTSC signal and the NTSC AGC voltage supplied to channel measurement module 113 are provided to an analog-to-digital (A/D) converter 201 having a separate memory 202 which is accessed by the control microprocessor 111. Database 112 is divided into a data memory 203 and a program memory 204. The data memory contains a channel occupancy database. The program memory stores a fast Fourier transform (FFT) and power spectrum algorithm used by the microprocessor to calculate preliminary equalizer coefficients. Program memory 204 also stores the results of the preliminary equalizer coefficient calculations.

When the television receiver is not being viewed (e.g., when the viewer turns off the display), the NTSC and ATSC tuners 103 and 104 shown in FIG. 1 scan various channels and update database 112. Each entry in the database corresponds to a channel. These channels may be terrestrial broadcast, satellite or cable channels. The data entered in the database for each channel include such information as whether a transmitter is detected, ATSC or NTSC, what hours of the day it operates, how strong the signal is, and time of day and day of the week. If the channel being scanned is an ATSC channel, it will also contain information about the best estimate of the equalization coefficients needed to optimize reception. Preferably, the best estimates of equalization are time-indexed to time of day and day of week.

Microprocessor 111 may perform "clustering studies" in which sets or clusters of similar equalization coefficients are encountered and identified and stored. Such clustering may result from environmental changes that are not strictly random and are thus nearly repeatable, such as a door with a significantly pronounced reflecting surface being either open or shut for a fixed duration each day. Identification and storage of these clusters of equalization coefficients can greatly reduce the search time for more nearly optimal antenna element combining, as disclosed in copending patent application Ser. No. 09/422,445.

When the television receiver is turned on and displaying a television signal from a digital source, ATSC tuner 104 is dedicated to the particular channel in use. At this time, microprocessor 111 continuously cycles through all of the entries in the channel occupancy database stored in memory 203 (FIG. 2). At each entry that is an ATSC channel, but not the channel currently being displayed, microprocessor 111 stops and tunes NTSC tuner 103 to this channel. When the NTSC tuner has stabilized on this channel, microprocessor 111 records the signal strength of the channel. This information comes from digitizing the NTSC tuner automatic gain control (AGC) voltage.

Microprocessor 111 next causes A/D converter 201 of FIG. 2 to perform a large number of high speed A/D conversions on the NTSC signal. These conversions are stored in A/D memory 202 of channel measurement module 113. An appropriate conversion sequence might consist of 4096 conversions of 8 bits per conversion, where the conversions are performed at a rate of 12 million conversions per second. Other numbers of conversions, resolutions and conversion rates can alternatively be used depending on design choice. After these conversions have been performed and recorded in memory 202, microprocessor 111 uses the algorithms in program memory 204 for preliminary equalizer coefficient calculations and calculates preliminary coefficients for use by the ATSC tuner equalizer section to tune in the ATSC signal in an ATSC channel. The microprocessor then makes an evaluation of whether these preliminary coefficients are likely to be better than the coefficients stored in the channel occupancy database entry in data memory 203 for this channel. If the new coefficients are likely to cause the ATSC tuner to acquire this channel faster, then the new coefficients replace the old coefficients. If the new coefficients are not likely to speed the channel acquisition process, the new coefficients are discarded. At this time, microprocessor 111 proceeds to the next ATSC channel entry in the database of data memory 203 and repeats these operations. When the end of the database is reached, the microprocessor starts over at the beginning and continues cycling until the channel is changed by the viewer.

One criterion for declaring one set of coefficients better than another is if, following equalization, the total energy in the residuals of a new posited set is less than the total energy in the stored set, then the new set is declared to be the better set.

If the viewer changes channels to another ATSC channel, then microprocessor 111 immediately goes to the channel occupancy database entry in data memory 203 for the new channel. The microprocessor loads the preliminary coefficients into ATSC equalizer 108, shown in FIG. 1, as the new frequencies are being loaded into the front end frequency synthesizers in ATSC tuner 104. This procedure enables the first attempt at channel equalization to come much closer to the final value, speeding the convergence and reducing the time needed to acquire the new channel.

While only certain preferred features of the invention have been illustrated and described, many modifications and changes will occur to those skilled in the art. It is, therefore, to be understood that the appended claims are intended to cover all such modifications and changes as fall within the true spirit of the invention.

Having thus described our invention, what we claim as new and desire to secure by Letters Patent is:

1. Apparatus for improving channel acquisition and reception in a digital television receiver comprising:

first and second tuners for receiving an input signal;

a memory connected to the first and second tuners for storing a channel occupancy database and preliminary equalization coefficients for channels in the database;

a control microprocessor connected to the memory for accessing the memory in response to selection of a channel, the control microprocessor loading preliminary equalization coefficients into said first tuner for the selected channel and controlling the second tuner to scan non-selected channels in the database; and a channel measurement module connected to the control microprocessor for measuring signal parameters of an output signal of the second tuner and to provide data to the control microprocessor, the control microprocessor using the data from the channel measurement module to perform calculation to obtain the preliminary equalization coefficients and store the preliminary equalization coefficients in the memory, wherein the control microprocessor periodically performs equalizer coefficient calculations for channels in the channel occupancy database of the memory by comparing calculated equalizer coefficient calculations for scanned channels to the preliminary equalizer coefficients stored in the memory, and the control microprocessor evaluating the calculated equalizer coefficients to determine if the calculated equalizer coefficients are likely to be better than the preliminary equalizer coefficients stored in memory, and the control microprocessor updating said preliminary equalizer coefficients stored in memory with the calculated equalizer coefficients when the evaluation indicates that the calculated equalizer coefficients are likely to be better than the coefficients stored in memory.

2. The apparatus for improving channel acquisition and reception in a digital television receiver recited in claim 1, wherein the control microprocessor is adapted to index the preliminary equalization coefficients in the database by time.

3. The apparatus for improving channel acquisition and reception in a digital television receiver recited in claim 1, wherein the first tuner comprises an ATSC (Advanced Television Standards Committee) tuner and the second tuner comprises an NTSC (National Television Standards Committee) tuner.

4. The apparatus for improving channel acquisition and reception in a digital television receiver recited in claim 3, wherein the channel measurement module comprises an analog-to-digital converter connected to the control microprocessor for converting an analog signal from the second tuner to a digital signal.

5. A method for improving channel acquisition and reception in a digital television receiver comprising the steps of:

constructing and maintaining in memory a channel occupancy database of occupied channels;

periodically cycling through said occupied channels and tuning said occupied channels;

performing preliminary equalizer coefficient calculations for said occupied channels;

storing in memory said preliminary equalizer coefficients for said occupied channels;

periodically performing equalizer coefficient calculations for channels in said channel occupancy database;

comparing calculated equalizer coefficient calculations for said scanned channels to said preliminary equalizer coefficients stored in memory;

evaluating said calculated equalizer coefficients to determine if the calculated equalizer coefficients are likely to be better than said preliminary equalizer coefficients stored in memory; and updating said preliminary equalizer coefficients stored in memory with said calculated equalizer coefficients when said evaluation indicates that said calculated equalizer coefficients are likely to be better than the coefficients stored in memory.

6. The method for improving channel acquisition and reception in a digital television receiver recited in claim 5, wherein said preliminary equalizer coefficients are time-indexed as valid for certain time periods during a day and are updated during the certain time periods only.

7. The method for improving channel acquisition and reception in a digital television receiver recited in claim 5, wherein the step of periodically performing equalizer coefficient calculations is performed for all channels in the channel occupancy database when no channel is being viewed.

8. The method for improving channel acquisition and reception in a digital television receiver recited in claim 7, wherein the step of periodically performing equalizer coefficient calculations is performed for all channels in the channel occupancy database not being currently viewed.

9. Apparatus for improving channel acquisition and reception in a digital television receiver comprising:

an ATSC (Advanced Television Standards Committee) tuner and an NTSC (National Television Standards Committee) tuner for receiving an input signal;

a memory connected to the ATSC tuner and the NTSC tuner for storing a channel occupancy database and preliminary equalization coefficients for channels in the database;

a control microprocessor connected to the memory for accessing the memory in response to selection of a channel, the control microprocessor loading preliminary equalization coefficients into the ATSC tuner for the selected channel and controlling the NTSC tuner to scan non-selected channels in the database; and a channel measurement module comprising an analog-to-digital converter and connected to the control microprocessor for measuring signal parameters of an output signal of the NTSC tuner and to provide data to the control microprocessor, the control microprocessor using the data from the channel measurement module to perform calculation to obtain the preliminary equalization coefficients and store the preliminary equalization coefficients in the memory, wherein the control microprocessor periodically performs equalizer coefficient calculations for channels in the channel occupancy database of the memory by comparing calculated equalizer coefficient calculations for scanned channels to the preliminary equalizer coefficients stored in the memory, and the control microprocessor evaluating the calculated equalizer coefficients to determine if the calculated equalizer coefficients are likely to be better than the preliminary equalizer coefficients stored in memory, and the control microprocessor updating said preliminary equalizer coefficients stored in memory with the calculated equalizer coefficients when the evaluation indicates that the calculated equalizer coefficients are likely to be better than the coefficients stored in memory.

* * * * *